(12) United States Patent
Georgopoulos

(10) Patent No.: US 7,002,789 B1
(45) Date of Patent: Feb. 21, 2006

(54) CAPACITOR ASSEMBLY

(75) Inventor: George Georgopoulos, Pine Brook, NJ (US)

(73) Assignee: High Energy Corp., Parkesburg, PA (US)

( * ) Notice: Subject to any disclaimer, the term of this patent is extended or adjusted under 35 U.S.C. 154(b) by 0 days.

(21) Appl. No.: 11/065,492

(22) Filed: Feb. 24, 2005

Related U.S. Application Data

(60) Provisional application No. 60/620,560, filed on Oct. 20, 2004.

(51) Int. Cl.
*H01G 4/38* (2006.01)
(52) U.S. Cl. ............... 361/328; 361/329; 29/25.41; 29/25.42
(58) Field of Classification Search ............ 361/301.1, 361/328–329, 822, 830, 541, 522, 274.2
See application file for complete search history.

(56) References Cited

U.S. PATENT DOCUMENTS 6,922,326 B1 * 7/2005 Kubota et al. ........... 361/274.1

2002/0048139 A1 * 4/2002 Meadows et al. ........... 361/302
2003/0133251 A1 * 7/2003 Kitagawa et al. ........... 361/328

* cited by examiner

*Primary Examiner*—Anthony Dinkins
(74) *Attorney, Agent, or Firm*—Philip O. Post

(57) ABSTRACT

A capacitor assembly is formed from one or more capacitive elements placed between a pair of opposing brackets. Each bracket has at least one L-shaped section and an arcuate section. Each L-shaped section has a capacitor seating surface and an assembly connecting surface that is substantially perpendicular to the capacitor seating surface. The arcuate section is adjacent to the capacitor seating surface. The opposing ends of each capacitive element is in electrically contact with the capacitor seating surfaces on the opposing brackets. When secured to a bus bar by fasteners located in the regions formed by the arcuate sections of the opposing brackets the assembly connection surfaces serve as electrical and thermal conducting regions between the capacitor assembly and the bus bars. Alternatively a capacitor assembly may be secured to bus bars by fastening to the capacitor seating surfaces.

17 Claims, 5 Drawing Sheets

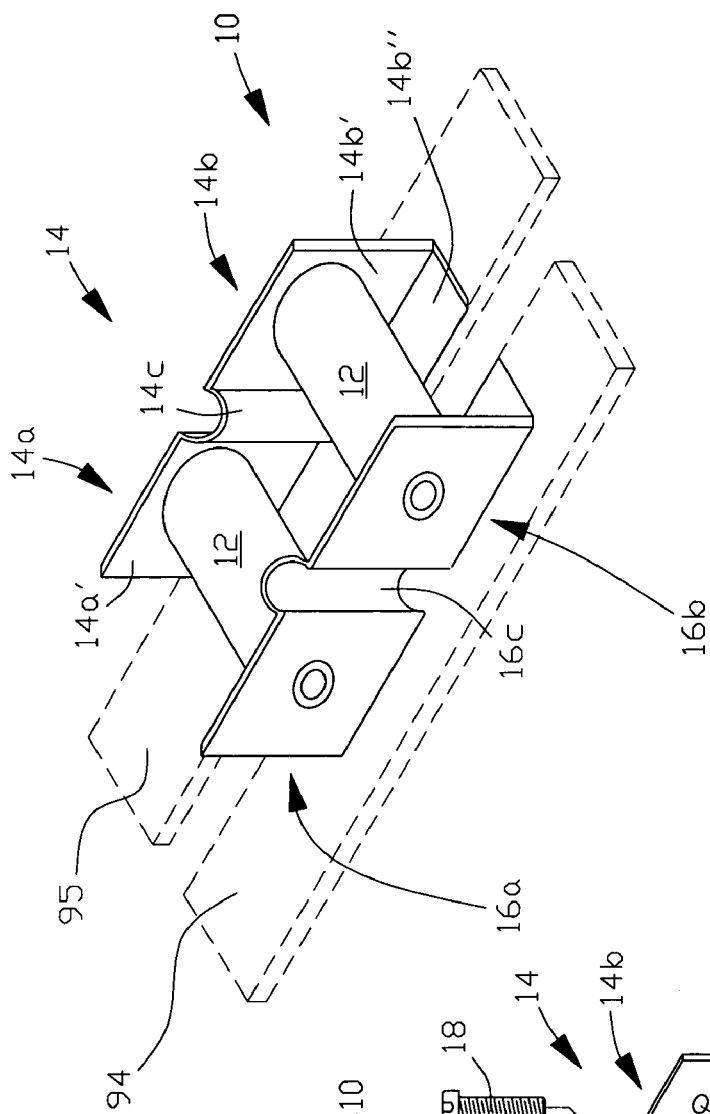
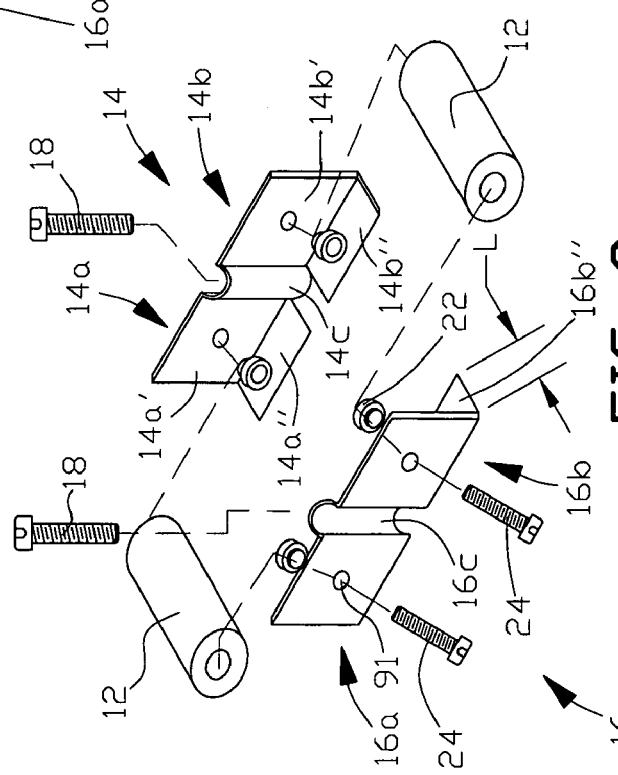
FIG. 1
FIG. 2

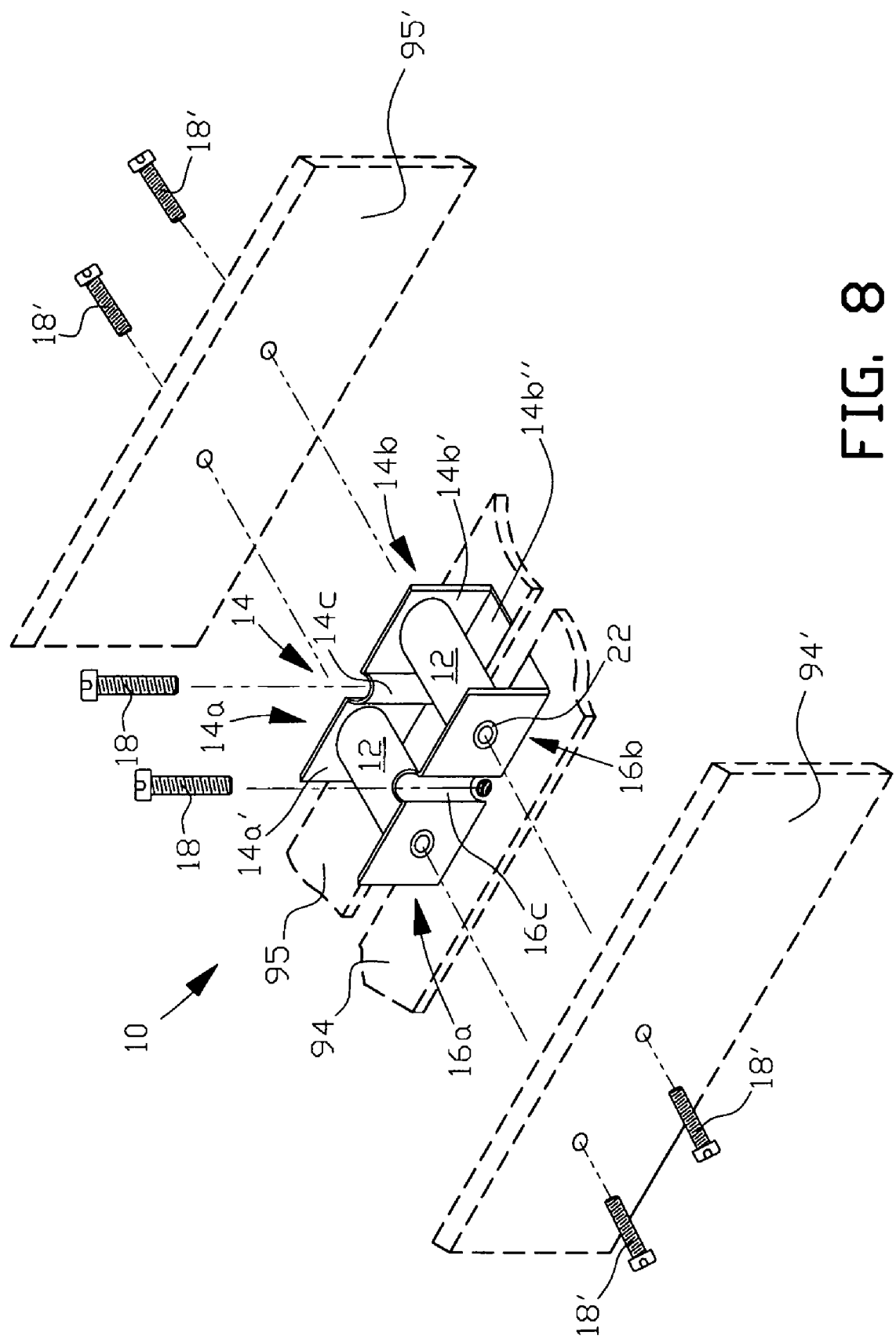

CAPACITOR ASSEMBLY

CROSS REFERENCE TO RELATED APPLICATIONS

This application claims the benefit of U.S. Provisional Application No. 60/620,560 filed Oct. 20, 2004, hereby incorporated herein by reference in its entirety.

FIELD OF THE INVENTION

The present invention generally relates to capacitors and capacitor assemblies for mounting capacitors to other electrical elements such as bus bars.

BACKGROUND OF THE INVENTION

Capacitors, such as high frequency capacitors, may be formed from one or more discretely wound capacitor elements mounted in an assembly. Each wound capacitor element may comprise a wound-film capacitor. Generally the capacitor assembly performs two functions. Multiple discrete wound capacitor elements are electrically connected together in the assembly to form a composite capacitor with the desired electrical characteristics, and the assembly may provide means for mounting the assembled capacitor to other electrical components such as bus bars.

A capacitor assembly may be formed from a first and second solid metal electrode between which the capacitor dielectric elements are connected as disclosed in U.S. Pat. No. 5,953,201. A through hole is bored in each solid metal electrode so that a fastener can be placed through the holes to attach the capacitor assembly to bus bars. A disadvantage of this arrangement is that the solid metal electrodes need to be machined or otherwise processed for the insertion of the capacitor dielectric elements between the electrodes and to create the through holes in, thus increasing the costs for producing the capacitor assembly. Therefore there is the need for a capacitor assembly comprising one or more capacitor elements that are joined together and mountable to bus bars without the need for solid electrodes.

BRIEF SUMMARY OF THE INVENTION

In one aspect, the present invention is a capacitor assembly formed by at least one capacitive element disposed between a pair of electrically conductive brackets that are electrically separate from each other. Each bracket comprises at least one flat L-shaped section and at least one arcuate section. Each L-shaped section comprises a capacitor seating surface and an assembly conducting surface. The arcuate surface is adjacent to the seating surface. Each of the at least one capacitive elements is connected at opposing ends to the capacitor seating surfaces on the pair of brackets. A fastener can be inserted into the region formed by the arcuate surface to connect the capacitor assembly to other electrical elements such as bus bars. When fastened to bus bars, the assembly conducting surfaces provide electrical and thermal conduction between the brackets and the bus bars.

In another aspect, the present invention is a method of forming a capacitor assembly. A flat electrically conductive material is used to form a bracket used in the assembly. A rectangular region is cut out of the bottom of the material below which an arcuate section will be formed. An arcuate section is formed above the cut out rectangular region. One or more L-shaped sections are formed adjacent to the arcuate section by bending the material approximately 90 degrees along a horizontal line extending along the bottom of the arcuate section to form one or more L-shaped sections having a capacitor seating surface adjacent to the arcuate section and an assembly conducting surface substantially normal to the capacitor seating surface. A fastener may be inserted into each region formed by the arcuate section to electrically and thermally connect the capacitor assembly to other electrical components, such as bus bars, by the assembly conducting surfaces on the one or more L-shaped sections.

Other aspects of the invention are set forth in this specification.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 1 is a perspective view of one example of the capacitor assembly of the present invention.

FIG. 2 is an exploded perspective view of the capacitor assembly shown in FIG. 1.

FIG. 8 is a perspective view of another example of the capacitor assembly of the present invention.

DETAILED DESCRIPTION OF THE INVENTION

Figure 3A:
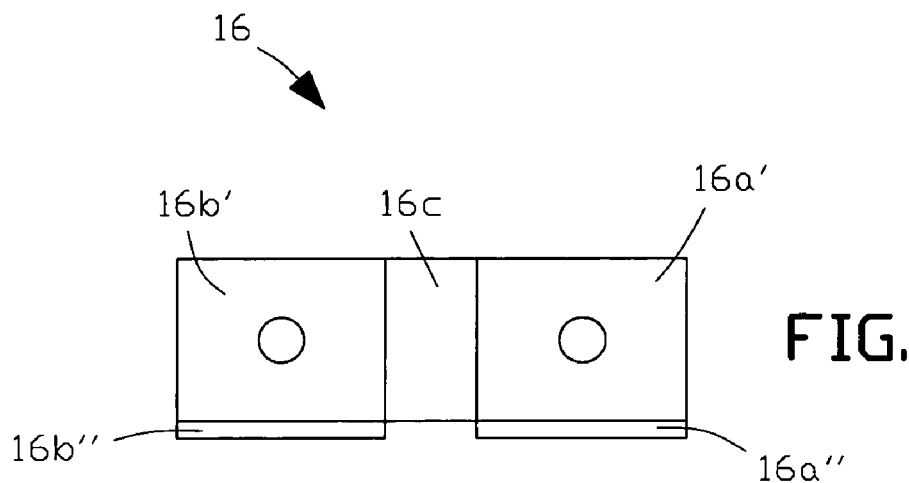
FIG. 3(a) is an elevation view of the inside of one example of a bracket used with a capacitor assembly of the present invention.
Figure 3B:
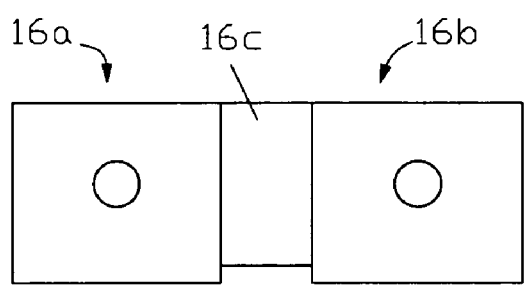
FIG. 3(b) is an elevation view of the outside of one example of a bracket used with a capacitor assembly of the present invention.
Figure 3C:
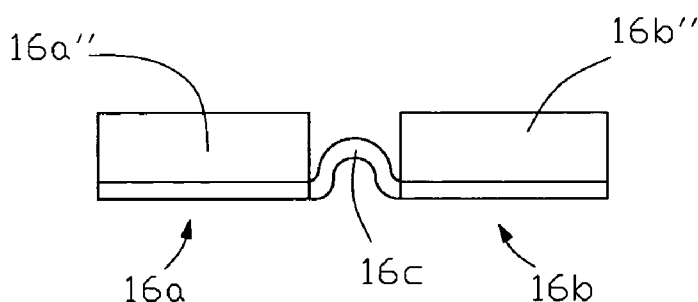
FIG. 3(c) is a top view of one example of a bracket used with a capacitor assembly of the present invention.

Referring now to the drawings, wherein like numerals indicate like elements, there is shown in FIG. 1 through FIG. 3(c), one example of the capacitor assembly 10 of the present invention. In this non-limiting example of the invention two film-wound capacitors or capacitive elements 12 are disposed between first bracket 14 and second bracket 16. Other examples of the invention may use a different number or type of capacitive elements. Each of the first and second brackets comprise one or more L-shaped sections, namely section 14a and section 14b for the first bracket, and section 16a and section 16b for the second bracket. Each of the first and second brackets have an arcuate section, namely arcuate section 14c for the first bracket and arcuate section 16c for the second bracket. In this non-limiting example of the invention, the arcuate sections protrude inward to the assembly; in other examples of the invention one or more of the arcuate sections may protrude outward from the assembly.

Each of the capacitive elements have their opposing ends suitably connected to the opposing capacitive seating surfaces (14a' and 14b' for the first bracket, and 16a' and 16b' for the second bracket) of the L-shaped sections to establish an electrical path between each end conductor of each capacitive element and the facing capacitor seating surface. One non-limiting means of connection is most clearly illustrated in FIG. 2. Fasteners 22 (four places) sit in holes 91 in the capacitor seating surfaces of the L-shaped sections and can provide a means for electrical contact between the end conductor of a capacitive element and its capacitor facing seating surface. Fasteners 22 can be PEM nuts, which are self-clinching nuts that secure themselves to the capacitor seating surfaces of the L-shaped sections when seated in the holes. Through fastener 24 can be inserted through holes 91, fasteners 22, if used, and the center spool passage of a capacitor element to hold a capacitive element in place in the capacitor assembly. If through fasteners 24 are threaded screws and fasteners 22 are used, the through fasteners can be screwed into fasteners 22, if threaded, to hold a capacitive element in place in the assembly. Alternatively in lieu of through fasteners 24, a separate fastener may be provided for mating with each fastener 22, or for mating directly with the end of a capacitive element. In other examples of the invention a solder connection may be made between the end of each capacitive element and the adjacent capacitor seating surface. Conducting surfaces (surface 14a" and surface 14b" for the first bracket, and surface 16a" and surface 16b" for the second bracket) on the L-shaped sections are disposed approximately 90 degrees to the capacitor seating surfaces. In this particular example of the invention the conducting surfaces face inward to the assembly; in other examples of the invention one or more of the conducting surfaces may face outward from the assembly. The inward length, L (FIG. 2), of each assembly conducting surface is such that the conducting surfaces of the opposing brackets do not make contact with each other.

Fasteners 18 (FIG. 2) can be inserted into the region formed inside of arcuate sections 14c and 16c to secure the capacitor assembly to other electrical components such as bus bars. By so securing the capacitor assembly to the bus bars, the bottom of the assembly conducting surfaces make contact with the bus bars to establish an electrical and thermal connection between the assembly conducting surfaces and the bus bars.

In another example of the invention as shown in FIG. 8, capacitor assembly 10 may be secured to vertical bus bars 94 and 95 by fasteners 18 inserted into the region formed inside of arcuate sections 14c and 16c and secured to the vertical bus bars, or alternatively, the capacitor assembly may be secured to horizontal bus bars 94' and 95' by fasteners 18' inserted through the openings in the horizontal bus bars and secured to the capacitor assembly by fasteners 22.

Figure 4:
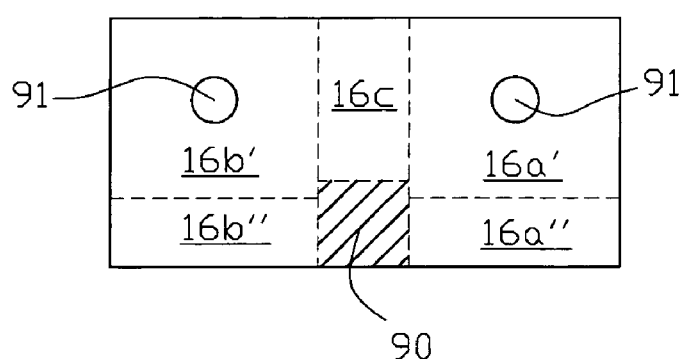
FIG. 4 is one example of a flat stock material used to form the bracket illustrated in FIG. 3(a) through FIG. 3(c).

Each of the first and second brackets may be formed from flat stock material of an electrically conductive material, such as, but not limited to, $\frac{1}{16}$-inch copper stock. FIG. 4 represents a rectangular flat stock material. Rectangular section 90 (shown crosshatched) is cut out of the bottom of the flat stock below where arcuate section 16c will be formed. The flat stock can be bent around mandrels to form the arcuate section and L-shaped sections 16a and 16b with capacitor seating surfaces 16a' and 16b' and assembly conducting surfaces 16a" and 16b". Holes 91 are drilled into the portion of the L-shaped sections forming the seating surfaces to accommodate fasteners and/or attachment of the capacitive elements.

Figure 5A:
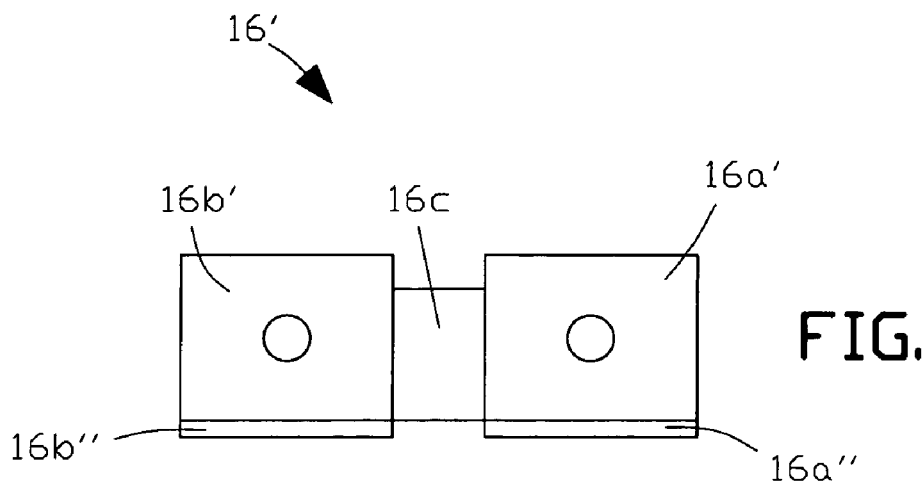
FIG. 5(a) is an elevation view of the inside of another example of a bracket used with a capacitor assembly of the present invention.
Figure 5B:
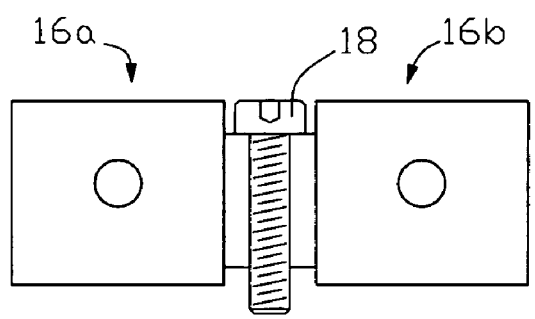
FIG. 5(b) is an elevation view of the outside of another example of a bracket used with a capacitor assembly of the present invention and a fastener inserted into the region formed around an arcuate section of the bracket.
Figure 5C:
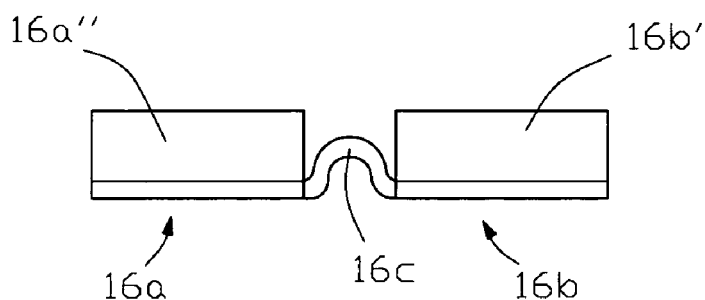
FIG. 5(c) is a top view of another example of a bracket used with a capacitor assembly of the present invention.
Figure 6:
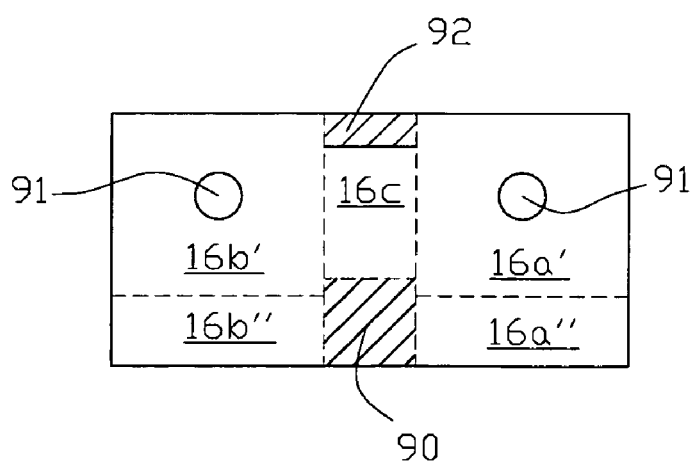
FIG. 6 is another example of a flat stock material used to form the bracket illustrated in FIG. 5(a) through FIG. 5(c).

In formation of alternate brackets illustrated in FIG. 5(a) through FIG. 5(c), a second rectangular section 92 (shown crosshatched) is cut out of the top of the flat stock represented in FIG. 6 above where the arcuate section 16c will be formed. With this alternate arrangement the heads of fasteners 18 can be seated flush with the top of the L-shaped sections of the brackets as shown in FIG. 5(b).

Figure 7:
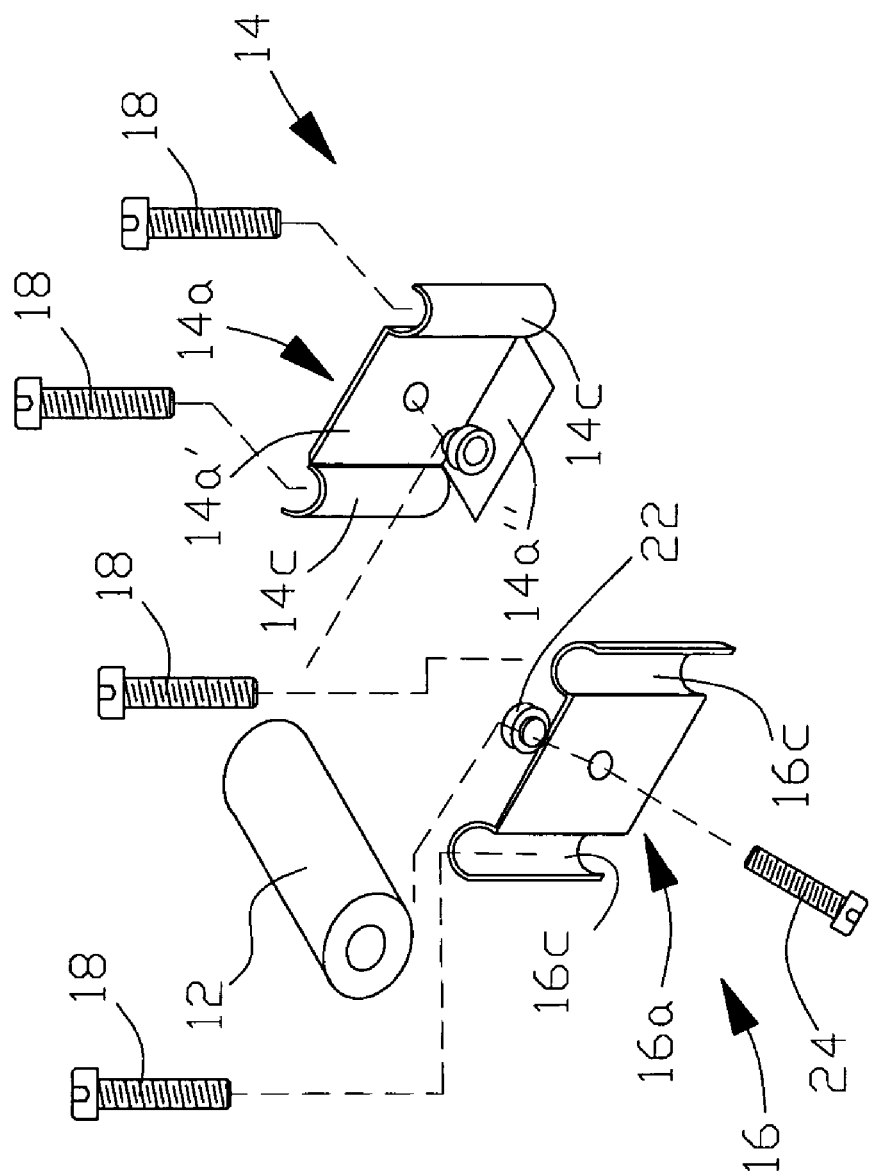
FIG. 7 is a perspective view of one example of the capacitor assembly of the present invention wherein one capacitive element is used.

For other examples of the invention, for example, when one capacitive element is disposed between opposing seating surfaces of the L-shaped sections, arcuate sections may be provided on opposing sides of each L-shaped section to provide a means for securing the capacitor assembly with four fasteners as illustrated in FIG. 7. Other examples of the invention may have different arrangements of arcuate sections as long as each arcuate section is adjacent to the capacitor seating surface of an L-shaped section of the bracket. Further in other examples of the invention the arcuate sections may form a totally enclosed region wherein the fastener is inserted.

The foregoing examples do not limit the scope of the disclosed invention. The scope of the disclosed invention is further set forth in the appended claims.

What is claimed is:

1. A capacitor assembly comprising:
a first and second bracket, each of the first and second brackets having a bracket arcuate section disposed between a pair of bracket L-shaped sections, each of the pair of bracket L-shaped sections having a capacitor seating surface and an assembly conducting surface, the capacitor seating surface adjacent to the bracket arcuate section and substantially perpendicular to the assembly conducting surface, and
at least two capacitive elements, each of the at least two capacitive elements having a first and a second end, the first ends of the at least two capacitive elements making electrical contact with the capacitor seating surfaces on the first bracket, the second ends of the at least two capacitive elements making electrical contact with the capacitor seating surfaces on the second bracket.

2. The capacitor assembly of claim 1 further comprising a hole in each of the capacitor seating surfaces, and a first fastener inserted into each of the holes of the capacitor seating surfaces to keep the first or second ends of the at least two capacitive elements in contact with its adjacent capacitor seating surface.

3. The capacitor assembly of claim 1 further comprising a hole in each of the capacitor seating surfaces, and a through fastener inserted through the center spool passage of one of the at least two capacitive elements and adjacent holes in the capacitor seating surfaces to keep the first or second ends of the one of the at least two capacitive elements in contact with its adjacent capacitor seating surface.

4. The capacitor assembly of claim 2 further comprising a through fastener inserted through the center spool passage of one of the at least two capacitive elements and adjacent first fasteners to keep the first or second ends of the one of the at least two capacitive elements in contact with its adjacent capacitor seating surface.

5. The capacitor assembly of claim 1 further comprising a solder connection between each end of the at least two capacitive elements and its adjacent capacitor seating surface.

6. The capacitor assembly of claim 1 further comprising a first connecting fastener inserted in the region formed by the bracket arcuate section in the first bracket and connected to a first bus bar, and a second connecting fastener inserted in the region formed by the bracket arcuate section in the second bracket whereby the assembly conducting surfaces of the first and second brackets make contact with the first and second bus bars respectively.

7. The capacitor assembly of claim 1 further comprising a hole in each of the capacitor seating surfaces, a first connecting fastener inserted in a first bus bar and each of the holes in the first bracket, and a second connecting fastener inserted in a second bus bar and each of the holes in the second bracket whereby the capacitor seating surfaces of the first and second brackets make contact with the first and second bus bars respectively.

8. A capacitor assembly comprising:
 a first and second bracket, each of the first and second brackets having a bracket L-shaped section disposed between a pair of bracket arcuate sections, the bracket L-shaped section having a capacitor seating surface and an assembly conducting surface, the capacitor seating surface adjacent to the pair of bracket arcuate sections and substantially perpendicular to the assembly conducting surface, and
 at least one capacitive element, each of the at least one capacitive elements having a first and a second end, the first end of each of the at least one capacitive elements making electrical contact with the capacitor seating surface of the first bracket, the second end of each of the at least one capacitive elements making electrical contact with the capacitor seating surface of the second bracket.

9. The capacitor assembly of claim 8 further comprising a hole in each of the capacitor seating surfaces, and a first fastener inserted into each of the holes of the capacitor seating surfaces to keep the first or second ends of the at least one capacitive elements in contact with its adjacent capacitor seating surface.

10. The capacitor assembly of claim 8 further comprising a hole in each of the capacitor seating surfaces, and a through fastener inserted through the center spool passage of one of the at least one capacitive elements and adjacent holes in the capacitor seating surfaces to keep the first or second ends of the one of the at least one capacitive elements in contact with its adjacent capacitor seating surface.

11. The capacitor assembly of claim 9 further comprising a through fastener inserted through the center spool passage of one of the at least one capacitive elements and adjacent first fasteners to keep the first or second ends of the one of the at least two capacitive elements in contact with its adjacent capacitor seating surface.

12. The capacitor assembly of claim 8 further comprising a solder connection between each end of the at least two capacitive elements and its adjacent capacitor seating surface.

13. The capacitor assembly of claim 8 further comprising a first connecting fastener inserted in each of the regions formed by the bracket arcuate sections in the first bracket and connected to a first bus bar, and a second connecting fastener inserted in each of the regions formed by the bracket arcuate sections in the second bracket whereby the assembly conducting surfaces of the first and second brackets make contact with the first and second bus bars respectively.

14. The capacitor assembly of claim 8 further comprising a hole in each of the capacitor seating surfaces, a first connecting fastener inserted in a first bus bar and each of the holes in the first bracket, and a second connecting fastener inserted in a second bus bar and each of the holes in the second bracket whereby the capacitor seating surfaces of the first and second brackets make contact with the first and second bus bars respectively.

15. A method of forming a capacitor assembly, the method comprising the steps of:
 removing at least one cutout rectangular section from the bottom of a first and a second electrically conductive rectangular stock;
 forming an arcuate section in the first and second electrically conductive rectangular stock above each of the removed at least one cutout rectangular sections;
 bending the first and second electrically conductive rectangular stock along a horizontal line extending along the bottom of the arcuate section to form an assembly conducting section approximately perpendicular to a capacitor seating section adjacent to the arcuate section; and
 electrically connecting at least one capacitive element between the capacitor seating sections on the first and second electrically conductive rectangular stock.

16. The method of claim 15 further comprising the step of inserting a fastener in the regions formed by the arcuate sections in the first and second electrically conductive rectangular stock and connecting the fastener associated with the first and section electrically conductive rectangular stock to a first and second bus bar, respectively, so that the assembly conducting surfaces of the first and second electrically conductive rectangular stock make contact with the first and second bus bars, respectively.

17. The method of claim 15 further comprising the steps of inserting a first fastener through a first bus bar and the capacitor seating section of the first electrically conductive rectangular stock, and inserting a second fastener through a second bus bar and the capacitor seating section of the second electrically conductive rectangular stock, so that the capacitor seating surface of the first electrically conductive rectangular stock makes contact with the first bus bar, and the capacitor seating surface of the second electrically conductive rectangular stock makes contact with the second bus bar.

* * * * *